(No Model.) 2 Sheets—Sheet 1.

E. W. BEACH.
CENTRIFUGAL SEPARATOR.

No. 587,171. Patented July 27, 1897.

Witnesses:
Jesse B. Heller
Frank S. Brosser

Inventor.
Edward W. Beach
G. Harding
Attorney.

(No Model.) 2 Sheets—Sheet 2.
E. W. BEACH.
CENTRIFUGAL SEPARATOR.
No. 587,171. Patented July 27, 1897.
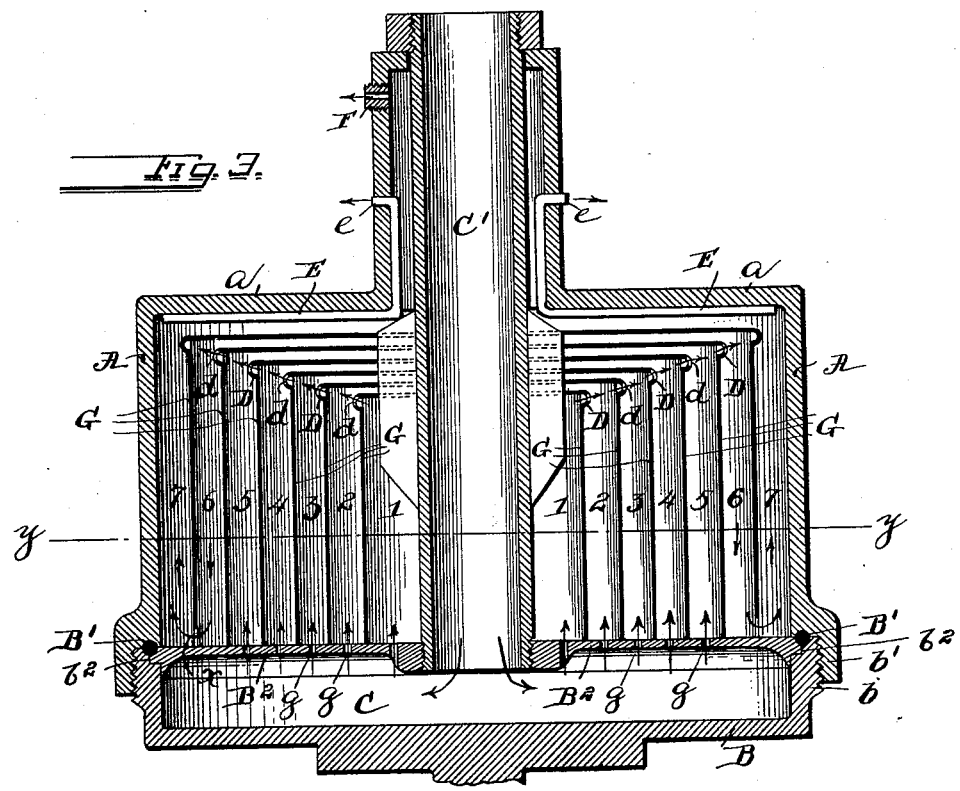
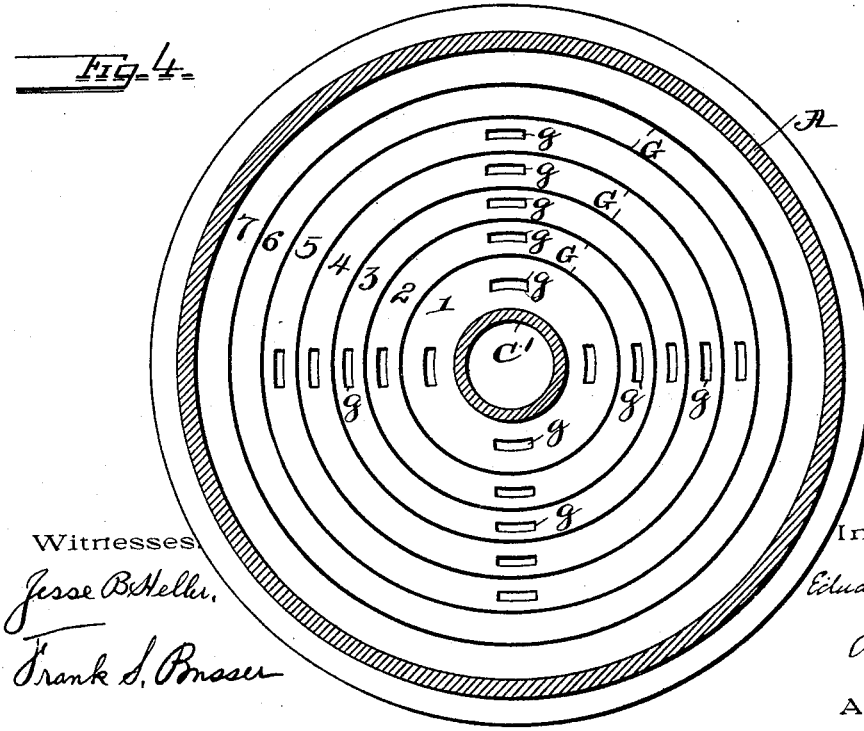
Witnesses
Jesse B. Heller.
Frank S. Prosser.
Inventor.
Edward W. Beach
J. G. Harding
Attorney.

United States Patent Office.

EDWARD W. BEACH, OF ELGIN, ILLINOIS, ASSIGNOR TO THE DE LAVAL SEPARATOR COMPANY, OF NEW JERSEY.

CENTRIFUGAL SEPARATOR.

SPECIFICATION forming part of Letters Patent No. 587,171, dated July 27, 1897.

Application filed April 17, 1896. Serial No. 587,921. (No model.)

*To all whom it may concern:*

Be it known that I, EDWARD W. BEACH, a citizen of the United States, residing at Elgin, county of Kane, and State of Illinois, have invented a new and useful Improvement in Centrifugal Separators, of which the following is a full, clear, and exact description, reference being had to the accompanying drawings, which form a part of this specification.

My invention is especially adapted for use in centrifugal machines and for separating liquids of different densities—such, for instance, as cream from skim-milk.

I will describe my invention as embodied in a machine for the separation of cream from milk, although I do not intend to limit my invention to such use alone.

Figure 1:
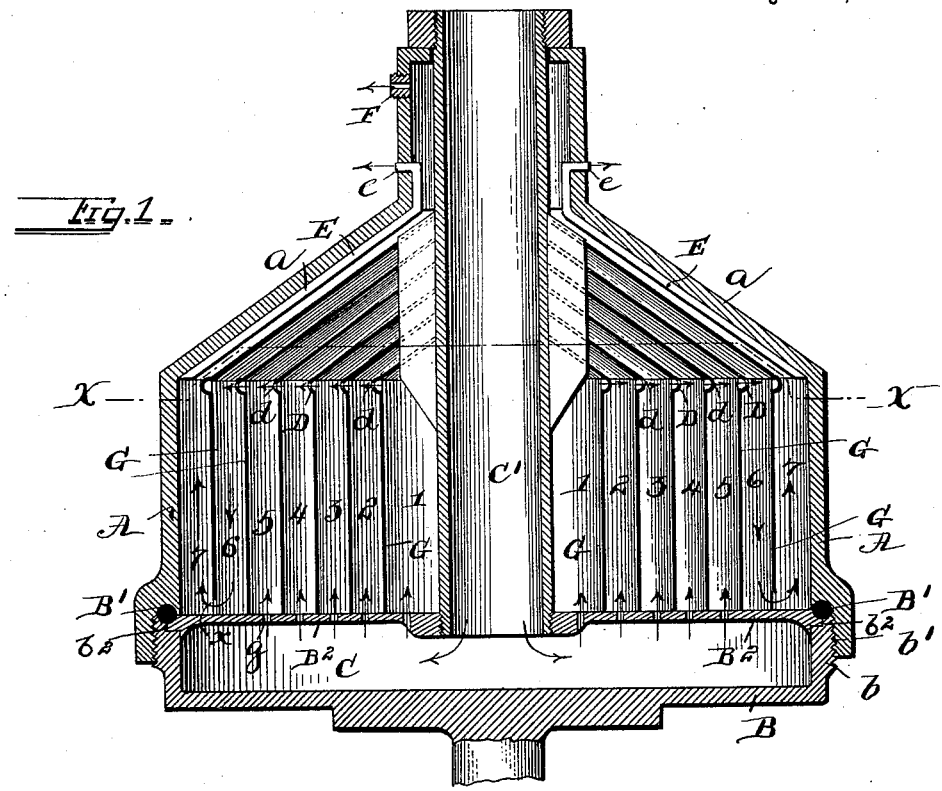
Figure 2:
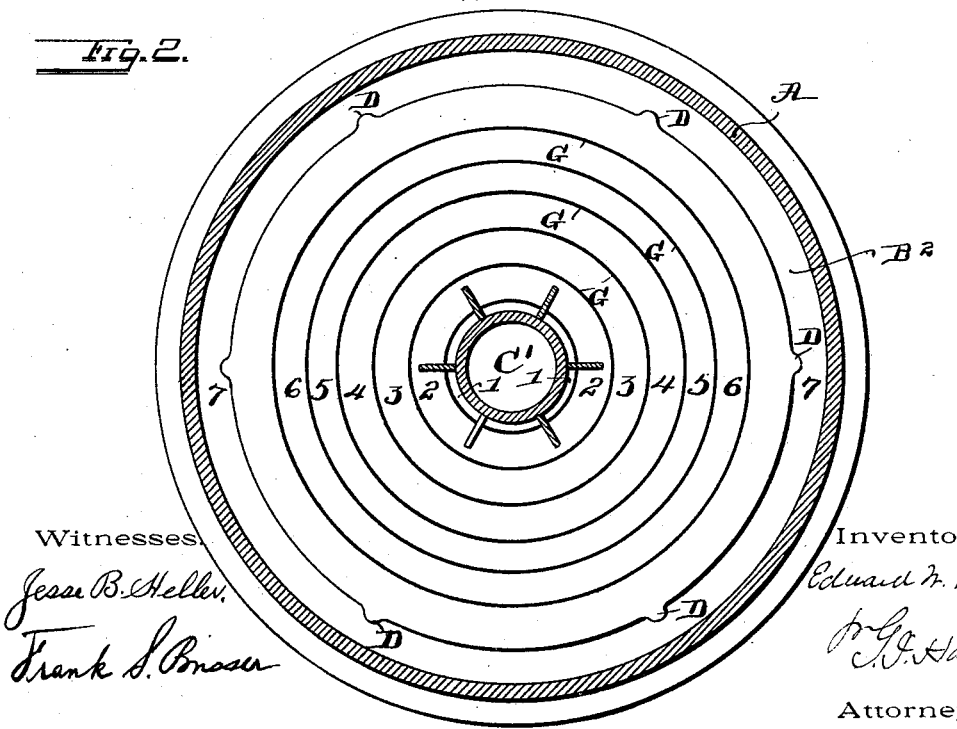

In the drawings, Figure 1 is a vertical section through a bowl embodying my invention. Fig. 2 is a section on the line $xx$, Fig. 1. Fig. 3 is a vertical section through a modified form of bowl embodying my invention. Fig. 4 is a section on line $yy$, Fig. 3.

Speaking now of Figs. 1 and 2, A is the main portion of the bowl, having the upper inwardly-inclined portion $a$.

B is a U-shaped metallic piece conforming and secured to the main portion of the bowl by means of the threaded portion $b$, interlocking with the threaded projecting piece $b'$, secured to or formed with the bowl A. Above the bottom of the U-shaped piece B is the division-plate $B^2$. This plate $B^2$ extends outwardly and conforms to and rests in a groove $b^2$ in the piece B. The space between the bottom of piece B and division-plate $B^2$ forms a compartment C, into which opens the inlet-tube $C'$.

Between the body of the bowl, division-plate $B^2$, and metallic piece B is a rubber ring $B'$, so as to form a tight joint between the compartment C and bowl A and also to prevent leakage of milk from either the bowl A or compartment C to the outer frame of the machine.

Within the bowl A are a number of shells G, conforming to the bowl, six being shown, forming compartments 1, 2, 3, 4, 5, 6, and 7. I do not, however, intend to limit myself to any particular number of compartments, as the number of said compartments may be varied without departing from my invention. Between each of these compartments, with the exception of 6 and 7, and the compartment C an opening $g$ is made in division-plate $B^2$. At the point where these compartments commence to conform to the portion $a$ of the bowl a shoulder D is formed on each compartment and an opening $d$ made between contiguous compartments, with the exception of 6 and 7, at this point.

E is the skim-milk tube, and $e$ the skim-milk orifice of discharge.

F is the cream-orifice of discharge.

The full milk passing by the inlet-tube $C'$ enters the compartment C and by means of the openings $g$ enters the compartments 1, 2, 3, 4, and 5 and in the operation of the machine is separated and cream and milk rising together in the compartments until the shoulder D is reached, when the skim-milk passes through the openings $d$ while the cream follows the inclined portion of the shells conforming to the portion $a$ of the bowl and passes to the cream-zone, from which it is discharged through the cream-orifice F. If any separation takes place in the inclined portion of the shells, the skim-milk will find its way to the shoulders D. The skim-milk passes through the orifices $d$ to the compartment 6, down which it passes and escapes through openings $x$ in the lower portion of the outer wall of this compartment into the compartment 7, up which it passes to the skim-milk tube E and outlet $e$.

The shoulder D of each compartment is of such size as to project within the contiguous compartment beyond the normal cream-wall, so that the skim-milk is delivered from compartment to compartment beyond the cream-wall and into the skim-milk of said compartment.

In Fig. 3 the portion $a$ of the bowl instead of being inclined is horizontal and parallel to the bottom, and the portion of the shells beyond the shoulders D are horizontal to conform to said portion $a$.

In other respects the construction and operation are the same in both figures.

The arrangement of the shells can be variously modified. Thus openings $g$ may be made to alternate compartments only, and in those compartments when there were openings $g$ there would be openings in the shoulder D, while in the other compartments the shell forming the outer side would not extend to the bottom A of the bowl, thus making the passage of the skim-milk alternately up and down the series of compartments. Again, an opening $g$ might be made to compartments 6 and 7 as well as the other compartments of Figs. 1 and 2. In this case there is an opening in the shoulder D of the outer wall of compartment C.

In all the constructions shown, as may be seen, the skim-milk passing from one compartment to the other at the shoulder D passes to the skim-milk wall, while the cream passes the shoulder without meeting the skim-milk. Thus the currents of each from their initial position to discharge are uninterrupted.

Having now fully described my invention, what I claim, and desire to protect by Letters Patent, is—

1. A centrifugal-separator bowl having an independent compartment in connection with a charging-inlet, the main body of the bowl being divided into a series of compartments by shells having a vertical portion and a portion extending toward the center of the bowl, provided with passages projecting into the contiguous compartments whereby the heavier liquid is delivered from compartment to compartment beyond the lighter-liquid wall and into the heavier liquid of said compartment, and openings from the independent compartment to one or more of the compartments of the bowl.

2. A centrifugal-separator bowl having an independent compartment in connection with charging-inlet, the main body of the bowl being divided into a series of compartments by shells having a vertical portion and a portion extending toward the center of the bowl, there being shoulders at the juncture of said portions of the shells, and orifices in one or more of said shoulders, there being openings from the independent compartment to one or more of the compartments in the main body of the bowl.

3. A centrifugal-separator bowl having an independent compartment in connection with charging-inlet, the main body of the bowl being divided into a series of compartments by shells having a vertical portion and a portion extending toward the center of the bowl, there being shoulders in one or more of said compartments at the juncture of said portions of the shells, and orifices in one or more of said shoulders, said shoulders extending into contiguous compartments, there being openings from the independent compartment to one or more of the compartments in the main body of the bowl.

4. A centrifugal-separator bowl having an independent compartment in connection with charging-inlet, the main body of the bowl being divided into a series of compartments by shells having a vertical portion, and a portion extending toward the center of the bowl, there being openings between the upper portion of one or more contiguous compartments, and openings between the lower portion of one or more contiguous compartments and openings from the independent compartment to one or more of the compartments in the main body of the bowl.

5. A centrifugal-separator bowl having an independent compartment in connection with charging-inlet, the main body of the bowl divided into a series of compartments by shells having a vertical portion and a portion extending toward the center of the bowl, there being in one or more of said compartments shoulders at the juncture of said portions of the shells, and orifices in one or more of said shoulders, said shoulders extending into contiguous compartments, and openings between the lower portion of one or more of said compartments, and openings from the independent compartment to one or more of the compartments in the main body of the bowl.

In testimony of which invention I have hereunto set my hand.

EDWARD W. BEACH. [L. S.]

Witnesses:
  WILLIAM H. HARRINGTON,
  JEAN A. JOHNSON.